Patented Mar. 4, 1952

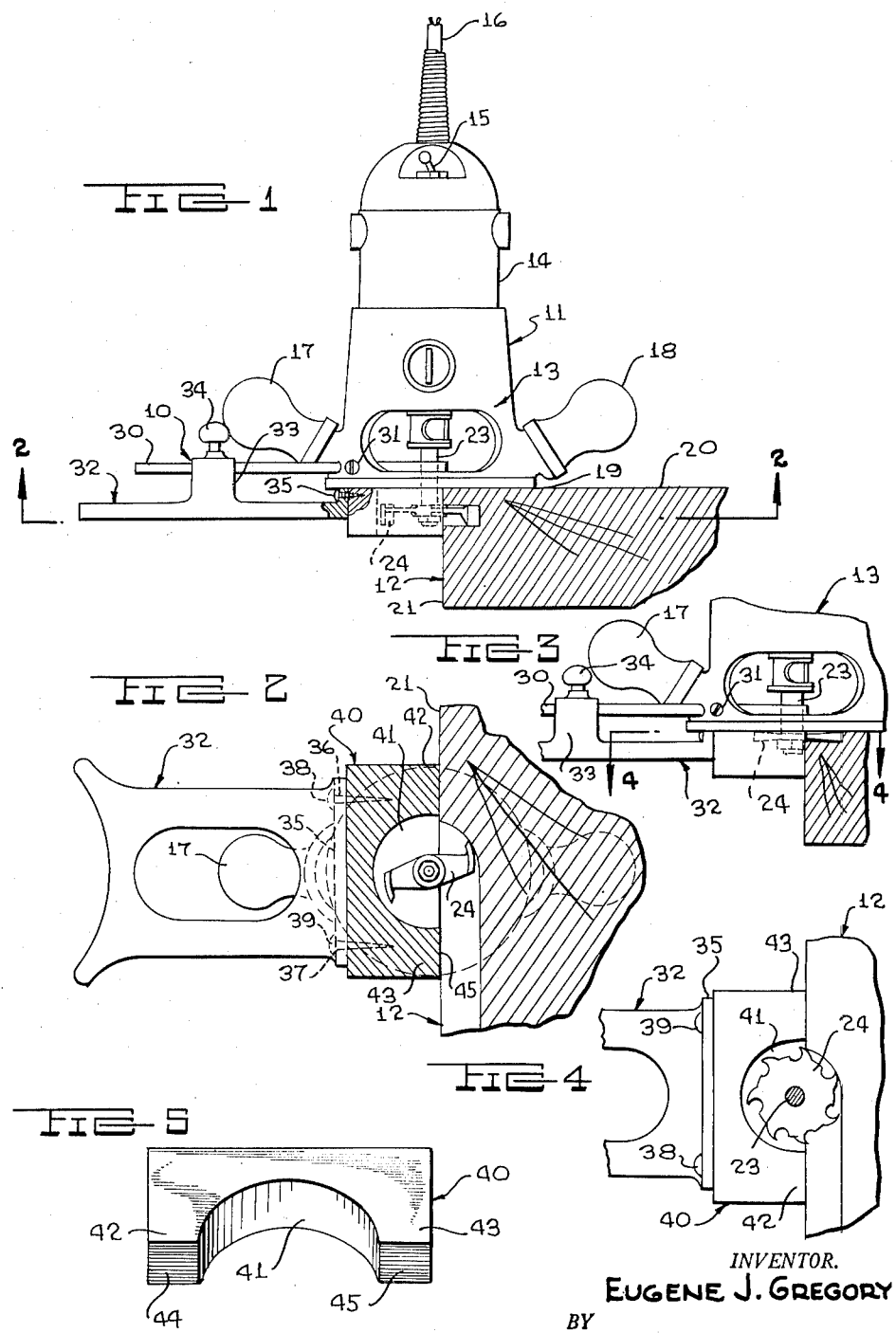

2,587,994

UNITED STATES PATENT OFFICE 2,587,994

GUIDE AND ROUTING DEVICE FOR PORTABLE WOODWORKING MACHINES

Eugene J. Gregory, Seattle, Wash.

Application December 1, 1950, Serial No. 198,695

2 Claims. (Cl. 144—136)

This invention relates to a guide and routing device for a portable woodworking machine.

An object of this invention is to provide a guide and routing device for a portable woodworking machine of the type including a tool-carrying drive shaft projecting beyond the work-engaging surface, which particularly adapts the machine for use in the field of rabbeting.

Another object of this invention is to provide a guide and routing device for a portable woodworking machine of the type including a tool-carrying drive shaft projecting beyond a work-engaging surface, which particularly adapts the machine for rabbeting a surface of a cabinet or the like to a uniform depth.

Another object of this invention is to provide a guide and routing device for a portable woodworking machine of the type including a tool-carrying drive shaft projecting beyond a work-engaging surface, which particularly adapts the machine for selectively rabbeting the surface of a cabinet, door or the like to a predetermined uniform depth.

A further object of this invention is to provide a guide and routing device for a portable woodworking machine which is relatively simple in structure and cheap to manufacture.

The above and still further objects and advantages of the present invention will become apparent upon consideration of the following detailed description of the invention when taken in conjunction with the accompanying drawings, wherein:

Figure 1 is an elevational view, with parts broken away and shown in section, of the guide and routing device of the present invention shown attached to a portable woodworking machine and engaged with a piece to be worked;

Figure 2 is a fragmentary sectional view taken on the line 2—2 of Figure 1;

Figure 3 is a fragmentary elevational view of the guide and routing device of the present invention shown attached to a portable woodworking machine having a circular saw blade for engagement with the piece to be worked;

Figure 4 is a fragmentary elevational view taken along the line 4—4 of Figure 3; and Figure 5 is a perspective view of the guide and routing block constructed according to the present invention.

Referring now more particularly to the drawings, wherein like reference numerals have been used throughout the several views to designate like parts, there is shown the guide and routing device of the present invention, generally designated by the reference numeral 40, attached to the portable woodworking machine 11 and engageable with the piece 12 to be worked.

The portable woodworking machine 11 includes a base 13 in which is seated the motor 14, the motor being provided with a control switch 15 and an electrical cord 16 for connection to a source of electrical energy, not shown. The supporting base 13 carries outwardly projecting hand grips 17 and 18 and is provided with a work-engaging surface 19. As clearly shown in Figure 1, the work-engaging surface 19 is adapted to ride along the adjacent surface 20 of the piece to be worked, the face 21 to be worked being arranged at right angles with respect to the face 20 being traversed by the work-engaging surface 19. Projecting from the work-engaging surface 19 of the supporting base 13 is a drive shaft 23 which has one end adapted to be arranged contiguous to and spaced from the face 21 of the piece 12 to be worked, and has the other end operatively connected to the motor 14. Carried by the projecting end of the drive shaft 23 is a rabbeting tool 24. The rabbeting tool, illustrated in Figures 1 and 2, is illustrated as a weatherstrip cutter, while the rabbeting tool illustrated in Figures 3 and 4 is of the H-circular saw type. It is to be understood that any type of rabbeting tool may be employed in conjunction with the guide and routing device 40 of the present invention.

A pair of slide rods 30 project outwardly from the supporting base 13 contiguous to the hand grip 17 and are disposed in spaced, parallel relation with respect to each other. The slide rods 30 are detachably secured to the supporting base 13 by means of the screws 31. Positioned beneath the slide rods 30 is a routing base 32 which has one end facing and spaced from the tool 24 and is connected to the supporting base 13 for sliding movement toward and away from the tool 24. The base 32 is formed with an upstanding lug 33 intermediate the ends thereof. The lug 33 is provided with a pair of spaced apertures for the extension therethrough of the slide rods 30. Carried by the lug 33 are the set screws 34 which engage the slide rods 30 for holding the routing base in a select position of its movement along the slide rods 30. The facing end of the routing base 32 contiguous to the rabbeting tool 24 is provided with an upstanding flange or plate 35 provided with spaced apertures 36 and 37.

Abutting the outer face of the plate 35 is the guide and routing device or block 40, Figure 5, which is positioned in confronting relation with respect to the work-engaging surface 19 of the supporting base 13, and is mounted for movement therealong toward and away from the rabbeting tool 24 in response to the movement of the routing base 32. As clearly shown in Figures 1 and 2, the block 40 is secured to the routing base 32 by means of the securing elements 38 and 39 which extend through the apertures 36 and 37 of the plate 35 and are received within the block 40. The block 40 may be fabricated of wood, plastic, or metal, and is arcuately cut away intermediate the ends thereof and contiguous to one side thereof to form a housing 41 for partially surrounding the rabbeting tool 24. The portions of the block 40 intermediate the arcuate cutout and the ends thereof define a pair of spaced abutments 42 and 43 which are engageable with the face 21 of the piece of work 12 to be rabbeted. As clearly shown in Figures 2 and 5, the abutments 42 and 43 include the abutment surfaces 44 and 45 which are arranged in coplanar relation with respect to each other and are movable along the face 21 in response to the movement of the work-engaging surface 19 of the supporting base 13 along the face 20 of the piece to be worked.

A woodworking machine equipped with the guide and routing device of the present invention is particularly valuable in the field of rabbeting, since in this capacity it is a highly accurate, versatile portable machine well suited to cabinet work, weatherstripping, and various other types of home utilities. For example, when the woodworking machine is to be used to weatherstrip a door, the guide and routing device is attached as illustrated in Figure 1, and the door is placed flat on a work table or the like. The door can be completely weatherstripped with interlocking weatherstripping notches without the necessity of turning the door or placing it on its edge. In the actual cutting operation, an H-circular saw blade, illustrated in Figures 3 and 4, is used in the woodworking machine to rabbet the top, bottom and sides of the door. During the cutting operation, the guide and routing device forms a solid footing, permitting extremely accurate work. The blade illustrated in Figures 3 and 4 is removed and replaced by the weatherstrip cutter illustrated in Figures 1 and 2. Upon completing the cutting operation, the door is ready to receive weatherstripping or the like.

Although only one embodiment of the guide and routing device of the present invention has been described, it is readily apparent that numerous modifications can be made without departing from the spirit of the invention as set forth in the appended claims.

What I claim is:

1. The combination with a portable woodworking machine including a supporting base, a rotatable drive shaft having one end projecting from said base, a rabbeting tool carried by the projecting end of said shaft, and a routing base arranged below said supporting base and having one end facing and spaced from said tool and connected to said supporting base for sliding movement toward and away from said tool, of a guide and routing solid one piece block having one face abutting said one end of said routing base and secured to the latter and having the other face cut away inwardly intermediate its ends to form a housing adapted to partially enclose the adjacent portion of said rabbeting tool when the routing base has been moved to its work engaging position.

2. The combination with a portable woodworking machine including a supporting base, a rotatable drive shaft having one end projecting from said base, a rabbeting tool carried by the projecting end of said shaft, and a routing base arranged below said supporting base and having one end facing and spaced from said tool and connected to said supporting base for sliding movement toward and away from said tool, of a guide and routing solid one piece block having one face abutting said one end of said routing base and detachably secured to an upstanding plate carried by said one end of said routing base and having the other face provided with an inwardly extending cut away portion intermediate its ends to form a housing adapted to partially enclose the adjacent portion of said rabbeting tool when the routing base have been moved to its work engaging position.

EUGENE J. GREGORY.

REFERENCES CITED

The following references are of record in the file of this patent:

UNITED STATES PATENTS

| Number | Name | Date |
| --- | --- | --- |
| 359,071 | Graham | Mar. 8, 1887 |
| 1,706,156 | Hall | Mar. 19, 1929 |
| 2,076,511 | Hedgpeth | Apr. 6, 1937 |
| 2,085,235 | Toutz | June 29, 1937 |
| 2,353,202 | Toutz | July 11, 1944 |